(12) United States Patent
Fischer et al.

(10) Patent No.: US 10,901,927 B2
(45) Date of Patent: *Jan. 26, 2021

(54) ADAPTIVE INTERFACE STORAGE DEVICE WITH MULTIPLE STORAGE PROTOCOLS INCLUDING NVME AND NVME OVER FABRICS STORAGE DEVICES

(71) Applicant: Samsung Electronics Co., Ltd., Suwon-si (KR)

(72) Inventors: Stephen G. Fischer, Mountain View, CA (US); Sompong Paul Olarig, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,649

(22) Filed: Nov. 26, 2019

(65) Prior Publication Data

US 2020/0097425 A1 Mar. 26, 2020

Related U.S. Application Data

(63) Continuation of application No. 16/020,923, filed on Jun. 27, 2018, now Pat. No. 10,521,378.

(Continued)

(51) Int. Cl.
*G06F 13/28* (2006.01)
*G06F 13/42* (2006.01)
(Continued)

(52) U.S. Cl.
CPC ............ *G06F 13/287* (2013.01); *G06F 3/061* (2013.01); *G06F 3/0655* (2013.01);
(Continued)

(58) Field of Classification Search
CPC ...... G06F 13/00; G06F 13/287; G06F 3/0061; G06F 3/0655; G06F 13/4208; G06F 3/0685
See application file for complete search history.

(56) References Cited

U.S. PATENT DOCUMENTS 9,304,690 B2 * 4/2016 McCambridge ...... G06F 3/0613
9,767,856 B2 9/2017 Shinsato
(Continued)

FOREIGN PATENT DOCUMENTS

CN 107220195 A 9/2017

OTHER PUBLICATIONS

NVME over fabric Overview—NVME Express HTTPs://nvmexpress.oprg/wp-content/uploads/NVMe_Over_Fabrics.pdf (Year:2017).

*Primary Examiner* — Tammara R Peyton
(74) *Attorney, Agent, or Firm* — Lewis Roca Rothgerber Christie LLP

(57) ABSTRACT

An adaptive interface storage device. In some embodiments, the adaptive interface storage device includes: a rear storage interface connector; an adaptable circuit connected to the rear storage interface connector; a first multiplexer, connected to the adaptable circuit; and a front storage interface connector, connected to the first multiplexer. The adaptive interface storage device may be configured to operate in a first state or in a second state. The adaptive interface storage device may be configured: in the first state, to present a device side storage interface according to a first storage protocol at the front storage interface connector, and in the second state, to present a device side storage interface according to a second storage protocol, different from the first storage protocol, at the front storage interface connector.

20 Claims, 5 Drawing Sheets

Related U.S. Application Data

(60) Provisional application No. 62/641,246, filed on Mar. 9, 2018.

(51) Int. Cl.
    *G06F 3/06*         (2006.01)
    *G06F 13/00*       (2006.01)

(52) U.S. Cl.
    CPC ........ *G06F 3/0685* (2013.01); *G06F 13/4208* (2013.01); *G06F 13/00* (2013.01); *G06F 2213/0026* (2013.01)

(56) References Cited

U.S. PATENT DOCUMENTS

| | | |
|---|---|---|
| 9,798,636 B2 | 10/2017 | Breakstone et al. |
| 10,095,645 B2 | 10/2018 | Davis et al. |
| 10,210,123 B2 | 2/2019 | Olarig et al. |
| 10,346,041 B2 | 7/2019 | Olarig et al. |
| 10,521,378 B2 * | 12/2019 | Fischer ................ G06F 3/0655 |
| 2014/0075006 A1 | 3/2014 | Cherian et al. |
| 2014/0089609 A1 | 3/2014 | Kegel et al. |
| 2015/0254088 A1 * | 9/2015 | Chou ...................... G06F 3/061 709/212 |
| 2016/0357695 A1 | 12/2016 | Johnston et al. |
| 2017/0011002 A1 | 1/2017 | Shin |
| 2017/0068628 A1 * | 3/2017 | Calciu ................ G06F 13/4022 |
| 2017/0185554 A1 | 6/2017 | Fricker |
| 2017/0212858 A1 | 7/2017 | Chu et al. |
| 2017/0262380 A1 | 9/2017 | Yoshida et al. |

\* cited by examiner

ADAPTIVE INTERFACE STORAGE DEVICE WITH MULTIPLE STORAGE PROTOCOLS INCLUDING NVME AND NVME OVER FABRICS STORAGE DEVICES

CROSS-REFERENCE TO RELATED APPLICATION(S)

The present application is a continuation of U.S. patent application Ser. No. 16/020,923, filed Jun. 27, 2018, which claims priority to and the benefit of U.S. Provisional Application No. 62/641,246, filed Mar. 9, 2018, entitled "METHOD FOR AUTOMATICALLY CONFIGURING THE PCIE INTERFACE OPTIMIZING FOR NVME OR NVME OVER FABRIC PROTOCOL"; the entire contents of both of the applications identified in this paragraph are incorporated herein by reference.

FIELD

One or more aspects of embodiments according to the present disclosure relate to persistent storage, and more particularly to a storage device having a configurable storage interface.

BACKGROUND

Persistent storage devices may be used in various applications and may be operated with various interfaces. In some applications, it may be inconvenient to maintain an inventory of storage devices supporting different storage interfaces, in a system in which multiple different interfaces are used.

Thus, there is a need for a storage device capable of operating with different storage interfaces.

SUMMARY

According to an embodiment of the present disclosure there is provided an adaptive interface storage device including: a rear storage interface connector; an adaptable circuit connected to the rear storage interface connector; a first routing circuit, connected to the adaptable circuit; and a front storage interface connector, connected to the first multiplexer; the adaptive interface storage device being configured to operate in a first state or in a second state, the adaptive interface storage device being configured: in the first state, to present a device side storage interface according to a first storage protocol at the front storage interface connector, and in the second state, to present a device side storage interface according to a second storage protocol, different from the first storage protocol, at the front storage interface connector.

In one embodiment, the adaptive interface storage device includes a first PCIe endpoint and a second PCIe endpoint, and the first routing circuit is a first multiplexer including: a first multiplexer channel having a first multiplexer channel common port connected to the front storage interface connector and a second multiplexer channel having: a second multiplexer channel common port connected to the front storage interface connector, a second multiplexer channel first selectable port connected to the first PCIe endpoint, and a second multiplexer channel second selectable port connected to the second PCIe endpoint.

In one embodiment, the first multiplexer channel has a first multiplexer channel first selectable port connected to the first PCIe endpoint.

In one embodiment, the first multiplexer channel has a first multiplexer channel second selectable port, the first multiplexer channel second selectable port being not connected, in the first state, the first multiplexer channel first selectable port is selected, and in the second state, the first multiplexer channel first selectable port is selected.

In one embodiment, the first storage protocol is NMVe.

In one embodiment, the adaptable circuit is connected to a first plurality of conductors of the front storage interface connector, and the adaptable circuit is configured, in the second state, to present an Ethernet interface at the first plurality of conductors.

In one embodiment, the second storage protocol is NVMe over Fabrics, over the Ethernet interface.

In one embodiment, in the first state, the second multiplexer channel first selectable port is selected.

In one embodiment, in the second state, the second multiplexer channel second selectable port is selected.

In one embodiment, the adaptive interface storage device is further configured, in the second state, to present a PCIe control plane interface at the front storage interface connector.

In one embodiment, the first PCIe endpoint is a four-lane PCIe endpoint, the second PCIe endpoint is a four-lane PCIe endpoint, and the second multiplexer channel common port has two input lanes and two output lanes.

In one embodiment, the adaptable circuit is a programmable adaptable circuit, having a configuration port, and being configured, at system startup, to load a bitfile through the configuration port.

In one embodiment, the first routing circuit is a first multiplexer, and the adaptive interface storage device further includes: a first bitfile memory; a second bitfile memory; and a second multiplexer, the second multiplexer having: a second multiplexer common port connected to the configuration port; a second multiplexer first selectable port connected to the first bitfile memory; and a second multiplexer second selectable port connected to the second bitfile memory.

In one embodiment, in the first state, the second multiplexer first selectable port is selected, and in the second state, the second multiplexer second selectable port is selected.

In one embodiment, the front storage interface connector is a U.2 connector.

In one embodiment, the adaptive interface storage device includes a state control input configured to receive a signal for selecting between the first state and the second state.

In one embodiment, the front storage interface connector is a U.2 connector having an E6 pin, and the state control input is the E6 pin.

According to an embodiment of the present disclosure there is provided an adaptive interface storage device, including: a front storage interface connector; and persistent storage, the adaptive interface storage device being configured to operate in a first state or in a second state, the adaptive interface storage device being configured: in the first state, to present a device side NVMe storage interface at the front storage interface connector, and in the second state, to present a device side NVMe over Fabrics storage interface at the front storage interface connector.

According to an embodiment of the present disclosure there is provided a storage system, including: a chassis; and an adaptive interface storage device, the adaptive interface storage device including: a rear storage interface connector; an adaptable circuit connected to the rear storage interface connector; and a first routing circuit, connected to the adaptable circuit, a front storage interface connector, connected to the first routing circuit and to the the adaptive interface storage device being configured to operate in a first state or in a second state the adaptive interface storage device being configured: in the first state, to present a device side storage interface according to a first storage protocol at the front storage interface connector, and in the second state, to present a device side storage interface according to a second storage protocol, different from the first storage protocol, at the front storage interface connector.

In one embodiment, the adaptive interface storage device further includes a state control input configured to receive a signal for selecting between the first state, and the second state, and the chassis is hard-wired to supply to the state control input a signal selecting the first state.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of an adaptive interface storage device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
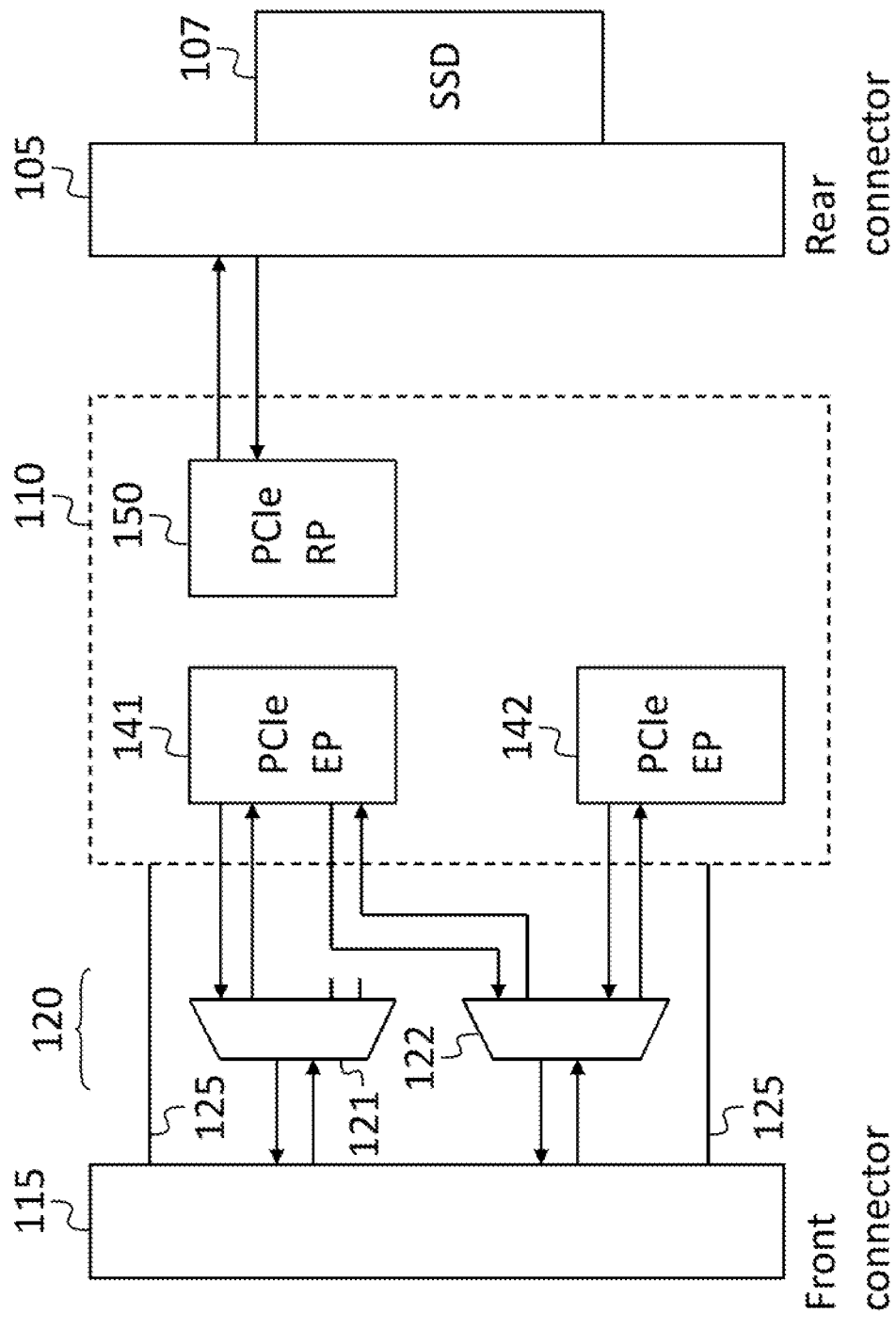
FIG. 1 is a block diagram of an adaptive interface storage device, according to an embodiment of the present disclosure.

Referring to FIG. 1, in some embodiments an adaptive interface storage device includes a rear storage interface connector 105, an adaptable circuit 110, a front storage interface connector 115, and a front multiplexer 120 connected between the front storage interface connector 115 and the adaptable circuit 110. These elements may act as an adapter module that may be connected, through the rear storage interface connector 105, to a fixed interface storage device (such as a nonvolatile memory express (NVMe) solid state drive (SSD)) 107, and behave, to a host chassis, as a storage device capable of supporting more than one storage interface. The front multiplexer may be an example of a routing or switching circuit, which in general may be any suitable circuit for routing signals to one of several available paths. If more than two paths are available, then a routing element such as a PCIe switch may be used. Routing may be, in one example, between only two elements.

In some embodiments, the adaptive interface storage device may conform to (i) a 3.5 inch hard drive form-factor (or "large form factor" (LFF)) standard, or (ii) a 2.5 inch hard drive form-factor (or small form factor (SFF)) standard, or (iii) a standard PCIe card form factor, e.g., a full-height, full length (FH-FL) card outline, or a full-height, half length (FH-HL) outline.

As used herein, a "storage interface" is an interface between (i) a storage device (e.g., a persistent storage device such as a hard drive or a solid state drive), and (ii) a host, such as a motherboard or processer connected to the storage device. In some embodiments the host is a chassis which provides power and mechanical support (e.g., mounting and cooling) to the storage device, and which is connected to the storage device and provides connections between another host (e.g., a server) and the storage device. In a connection, at a storage interface, between a persistent storage device and a host, the host may present a "host side storage interface" e.g., a host side NVMe storage interface, to the storage device (e.g., the host may send commands (e.g., read or write command), through an NVMe interface, to the storage device) and the storage device may present a "device side storage interface" e.g., a device side NVMe storage interface, to the host. As another example, the storage interface may be NVMe over Fabrics.

The adaptable circuit 110 may be a programmable logic circuit such as a field programmable gate array (FPGA). The embodiment of FIG. 1 may further include one or more sets of conductors, forming one or more connections (which may be referred to as "Ethernet connections") 125 between the adaptable circuit 110 and the front storage interface connector 115, and the adaptable circuit 110 may, in some modes of operation (or "states"), be configured to present one or more Ethernet interfaces (e.g., two Ethernet interfaces, as shown) at the Ethernet connections 125. The front storage interface connector 115 may be a U.2 connector, and the SAS port0 and SAS port1 pins of the U.2 connector may be used for the Ethernet connections.

The adaptive interface storage device of FIG. 1 may be configured to operate in one of two states, a first state and a second state; in the first state, the adaptive interface storage device may be configured to present a device side storage interface according to a first storage protocol (e.g., NVMe) at the front storage interface connector, and in the second state, the adaptive interface storage device may be configured to present a device side storage interface according to a second storage protocol, (e.g., NVMe over Fabrics), at the front storage interface connector 115.

The front multiplexer 120 may be configured differently in the first state and in the second state, to support the two different device side storage interfaces. The front multiplexer 120 may include a first multiplexer channel 121 and a second multiplexer channel 122 as shown in FIG. 1. Each of the first multiplexer channel 121 and the second multiplexer channel 122 may be controlled as discussed in further detail below. In some embodiments, the front multiplexer 120 is implemented as a single integrated circuit, e.g., a quad 1:2-2:1 multiplexer, linear redriver with signal conditioning, such as a model SN65LVCP114 integrated circuit available from Texas Instruments.

As used herein, a multiplexer is a device with a single common port, two or more selectable ports, and a select input. In operation, depending on a select signal received at the select input, the multiplexer connects (i.e., makes an internal connection between) the common port and one port (which may be referred to as the "selected port") of the selectable ports. Each port may be one lane wide or several lanes wide. All of the lanes of a port may be input lanes or output lanes, or a port may include a combination of input lanes and output lanes. A multiplexer with a common input port (having no output lanes) and a plurality of selectable output lanes may also be referred to as a de-multiplexer. A multiplexer with a common port that is several lanes wide may be equivalent to a plurality of multiplexers (which may be referred to as "multiplexer channels"), each multiplexer channel having fewer lanes (such that the total number of lanes of the multiplexer channels equals the number of lanes of the multiplexer to which they are, together, equivalent), and having a shared select input connection (i.e., each having its select input connected to the same select signal source). In some embodiments, a plurality of multiplexer channels may be included in a single integrated circuit (such as the model SN65LVCP114 integrated circuit available from Texas Instruments). Such an integrated circuit may, for example, include four independent channels (each one being one lane wide) and each having a separate, independent select input, so that the integrated circuit may have four select inputs.

As such, if a quad 1:2-2:1 multiplexer, linear redriver with signal conditioning, such as the model SN65LVCP114 available from Texas Instruments, is employed, it may be referred to as a single multiplexer (e.g., the front multiplexer 120), or as two multiplexer channels (the first multiplexer channel 121 and the second multiplexer channel 122), or as eight multiplexer channels, each one lane wide (together providing four input lanes and four output lanes).

The adaptable circuit 110 may include a first peripheral component interconnect express (PCIe) endpoint 141 and a second PCIe endpoint 142, which may form part of the implementation of the device side storage interface, or of a control plane interface, at the front storage interface connector 115, as discussed in further detail below. It may also include one or more PCIe root ports (or root complexes) 150 for implementing a host side storage interface, at the rear storage interface connector 105, to a fixed interface storage device 107 that may be connected to the rear storage interface connector 105.

Figure 2A:
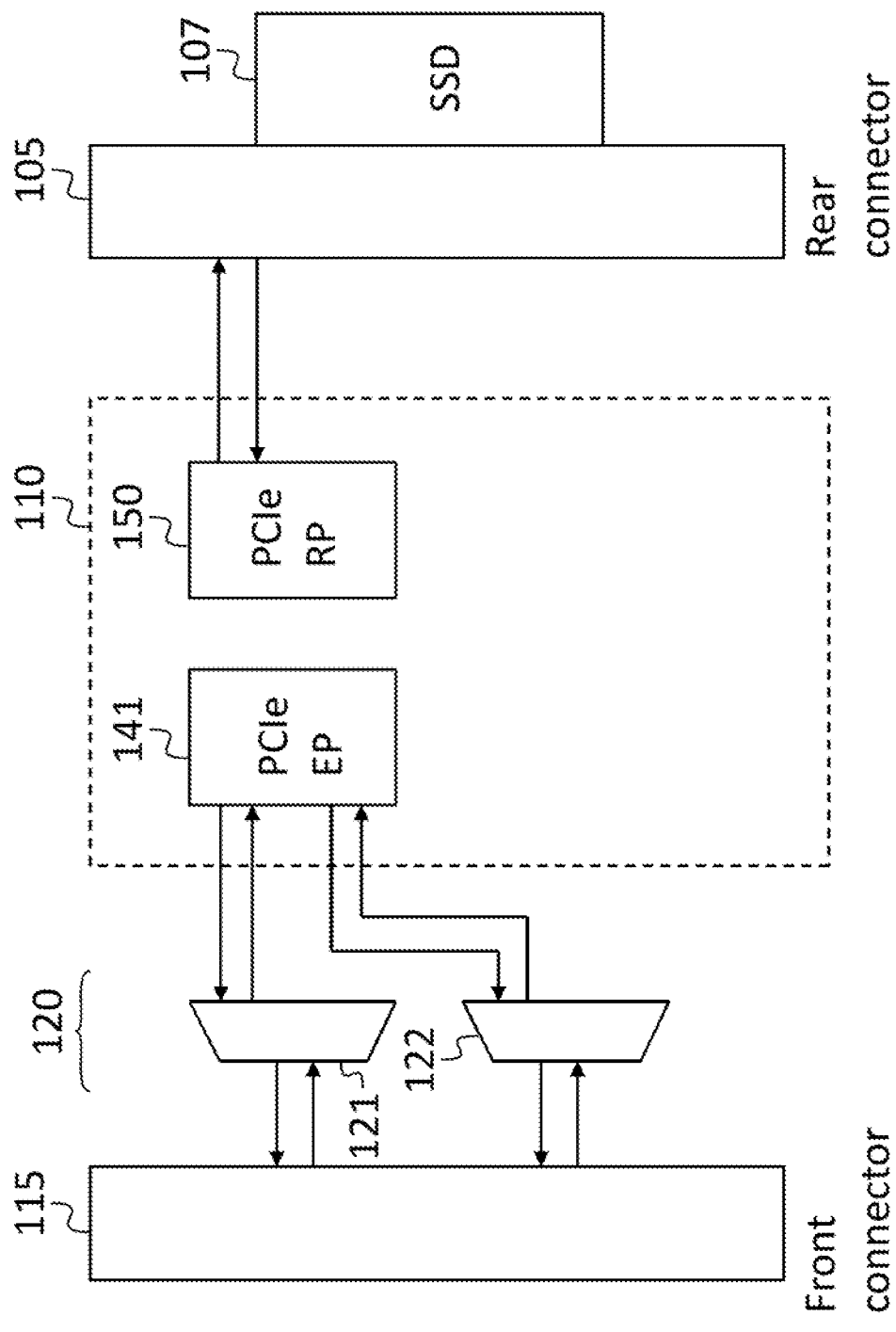
FIG. 2A is a block diagram of an adaptive interface storage device, according to an embodiment of the present disclosure.

Referring to FIG. 2A, in some embodiments, when the adaptive interface storage device is operating in the first state, the first selectable port of the first multiplexer channel is selected and the first selectable port of the second multiplexer channel is selected. In FIG. 2A this configuration is illustrated, for ease of comprehension, by omitting from the drawing the lines terminating at the second selectable port of the first multiplexer channel and at the second selectable port of the second multiplexer channel, even though the conductors making those connections in other circumstances (e.g., when the adaptive interface storage device is operating in the second state) may be present. The second PCIe endpoint 142 may be absent (as a result of the programming of the adaptable circuit 110 (as discussed in further detail below)) or it may be present but unused (as a result of the second selectable port of the second multiplexer channel not being selected). Similarly, the Ethernet connections 125 may not be operable when the adaptive interface storage device is operating in the first state (as a result of the programming of the adaptable circuit 110); this is illustrated, for ease of comprehension, by omitting from FIG. 2A the lines representing (e.g., in FIG. 1), the Ethernet connections 125, even though the conductors employed by these connections (e.g., when the adaptive interface storage device is operating in the second state) may be present.

In the first state, the device side storage interface presented at the front storage interface connector 115 may be NVMe. The adaptive interface storage device may receive NVMe commands from a host (e.g., a host connected to a chassis housing the adaptive interface storage device, as discussed in further detail below), and the commands may be forwarded to the fixed interface storage device 107 through the front multiplexer 120, the adaptable circuit 110, and the rear storage interface connector 105. The fixed interface storage device 107 may process each command, and send, in response to each received command, through the rear storage interface connector 105, a command response, which the adaptive interface storage device may forward back to the host through the adaptable circuit 110, the front multiplexer 120, and the front storage interface connector 115. The adaptive interface storage device may present a 1×4 NVMe device side storage interface to the host. The first PCIe endpoint 141 may be a 1×4 PCIe endpoint; two of the four lanes of the 1×4 NVMe device side storage interface (e.g., the first two lanes, lanes 0 and 1) may be connected to the first PCIe endpoint 141 through the first multiplexer channel 121, and the other two of the four lanes of the 1×4 NVMe device side storage interface (e.g., the third and fourth lanes, lanes 2 and 3) may be connected to the first PCIe endpoint 141 through the second multiplexer channel 122.

Figure 2B:
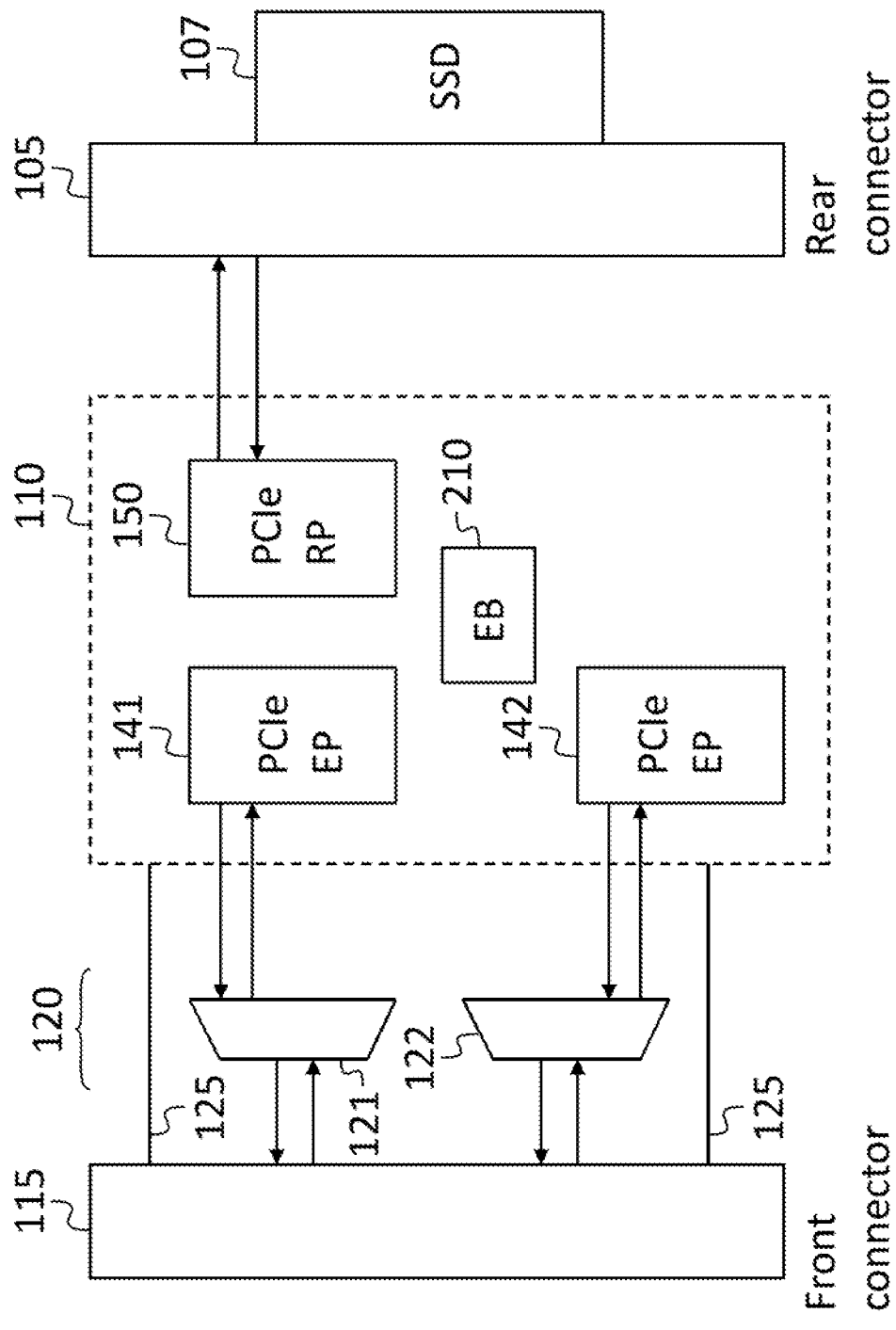
FIG. 2B is a block diagram of an adaptive interface storage device, according to an embodiment of the present disclosure.

Referring to FIG. 2B, in some embodiments, when the adaptive interface storage device is operating in the second state, the first selectable port of the first multiplexer channel is selected and the second selectable port of the second multiplexer channel is selected. In FIG. 2B this configuration is illustrated, for ease of comprehension, by omitting from the drawing the lines terminating at the second selectable port of the first multiplexer channel and at the first selectable port of the second multiplexer channel, even though the conductors making those connections in other circumstances (e.g., when the adaptive interface storage device is operating in the first state) may be present.

In the second state, the device side storage interface presented at the front storage interface connector 115 may be NVMe over Fabrics, over the one or more Ethernet connections 125. The adaptive interface storage device may receive NVMe over Fabrics commands through the Ethernet connections 125, and the commands may be forwarded to the fixed interface storage device 107 through the adaptable circuit 110 and the rear storage interface connector 105. The adaptable circuit 110 may include an Ethernet-NVMe bridge 210 for translating between the NVMe over Fabrics storage protocol employed at the front storage interface connector 115 and the NVMe storage protocol employed at the rear storage interface connector 105.

As is the case when the adaptive interface storage device is operating in the first state, when the adaptive interface storage device is operating in the second state, the fixed interface storage device 107 may process each command it receives, and send, for each received command, through the rear storage interface connector 105, a command response, which the adaptive interface storage device may forward back to the host through the adaptable circuit 110 and the front storage interface connector 115. The adaptive interface storage device may present an NVMe over Fabrics device side storage interface to the host.

When the adaptive interface storage device is operating in the second state, the first PCIe endpoint 141 may be a 1×4 PCIe endpoint and the second PCIe endpoint 142 may also be a 1×4 PCIe endpoint; together the first PCIe endpoint 141 and the second PCIe endpoint 142 may present, at the front storage interface connector 115, through the first multiplexer channel 121 and the second multiplexer channel 122, two ×2 (two by two) PCIe links for control plane operations. Such control plane operations may include, for example, updating erasure codes in the fixed interface storage device 107, or upgrading firmware in the adaptive interface storage device.

As may be seen from FIGS. 2A and 2B, the state of the first multiplexer channel 121 may be the same in the first state of the adaptive interface storage device and in the second state of the adaptive interface storage device (and the second selectable port of the first multiplexer channel 121 may be "not connected", i.e., not connected to any other element); it may be included in the system to provide delay equalization with PCIe lanes connected through the second multiplexer channel 122. Both when the adaptive interface storage device is operating in the first state and when the adaptive interface storage device is operating in the second state, the adaptive interface storage device may present a host side 1×4 NVMe storage interface to the fixed interface storage device 107, which, in turn, may present a device side 1×4 NVMe storage interface to the adaptive interface storage device.

Figure 3B:
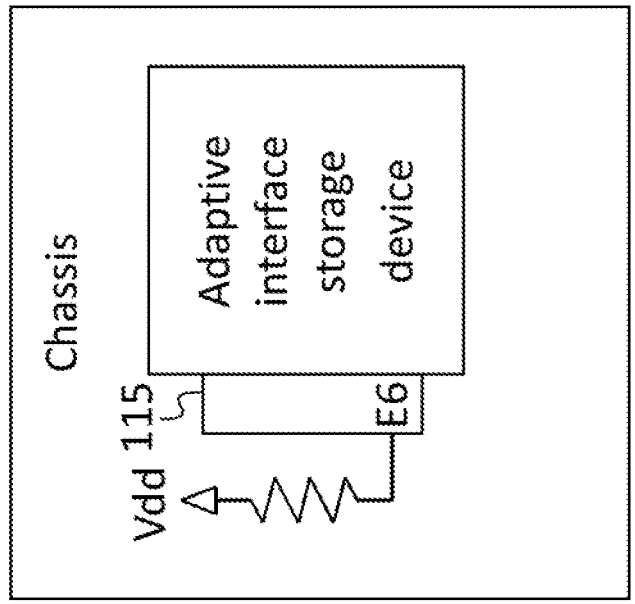
FIG. 3B is a block diagram of a chassis with an adaptive interface storage device, according to an embodiment of the present disclosure.
Figure 3A:
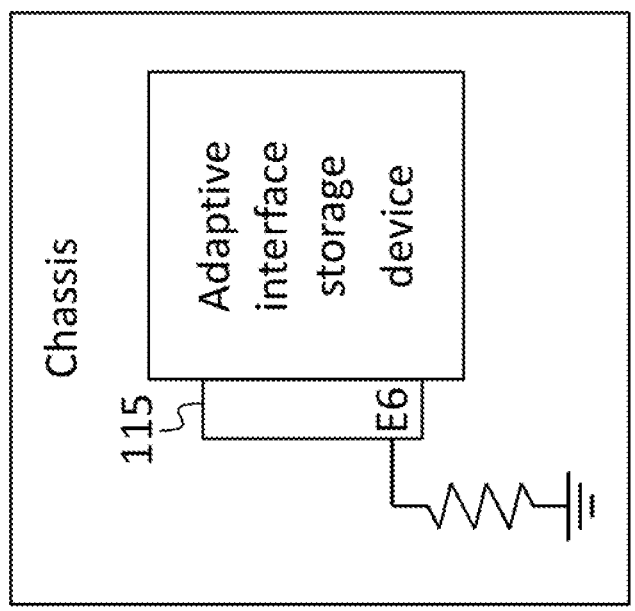
FIG. 3A is a block diagram of a chassis with an adaptive interface storage device, according to an embodiment of the present disclosure.

Referring to FIGS. 3A and 3B, in some embodiments the adaptive interface storage device is installed in a chassis, as mentioned above. The adaptive interface storage device may have a pin (e.g., the E6 pin of the U.2 connector, if the front storage interface connector 115 is a U.2 connector), through which the adaptive interface storage device receives a signal for selecting between the first state and the second state. The chassis may have wiring connecting this pin to ground (as in FIG. 3A) to signal to the adaptive interface storage device that it is to operate in the first state, or to Vdd (as in FIG. 3B) to signal to the adaptive interface storage device that it is to operate in the second state. Circuitry in the adaptive interface storage device may cause the adaptive interface storage device to operate in the state identified by the signal (e.g., the signal received at the E6 pin), by setting the front multiplexer 120 accordingly, and programming the adaptable circuit 110 accordingly, as discussed in further detail below.

Figure 4:
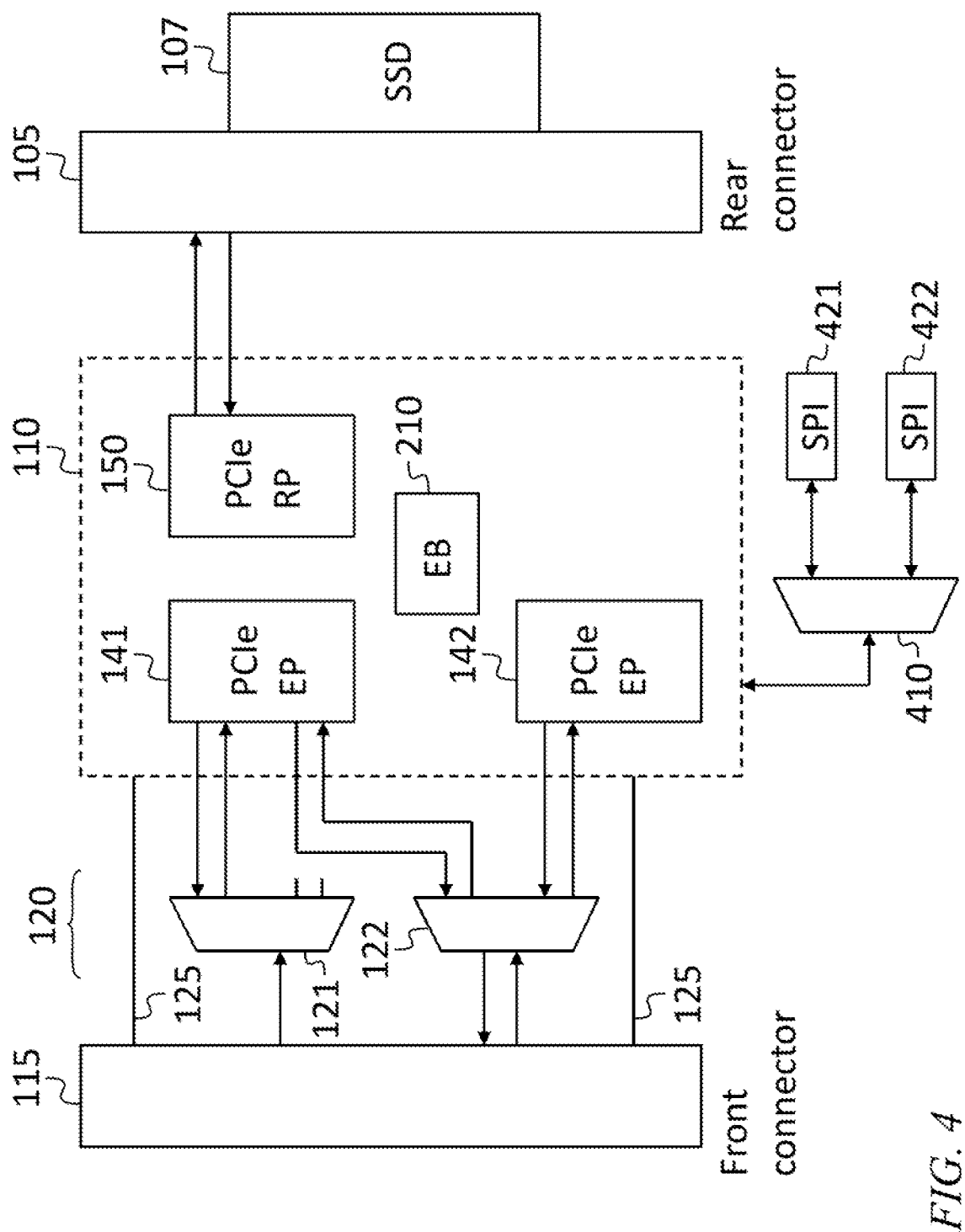
FIG. 4 is a block diagram of an adaptive interface storage device, according to an embodiment of the present disclosure.

Referring to FIG. 4, in some embodiments, the bitfiles loaded by the adaptable circuit 110 at startup (through a configuration port (e.g., a serial peripheral interface (SPI) configuration port) of the adaptable circuit 110) is selected based on the state in which the adaptive interface storage device is operating. For example, when the adaptive interface storage device is operating in the first state, a bitfile multiplexer 410 may connect the configuration port of the adaptable circuit 110 to a first memory 421 (e.g., an SPI flash memory) storing bitfiles for configuring the adaptable circuit 110 to operate in the first state, and in the second state, the bitfile multiplexer 410 may connect the configuration port of the adaptable circuit 110 to a second memory 422 (e.g., an SPI flash memory), storing bitfiles for configuring the adaptable circuit 110 to operate in the second state. As such, memory 421 may store only bitfiles for the first state, and memory 422 may store only bitfiles for the second state. One of the bitfiles in each of the first memory 421 and the second memory 422 may include a PCIe portion, that may be read into the adaptable circuit 110 and implemented first, causing the PCIe endpoints 141, 142 and root point 150 to be configured in time to participate in PCIe link training. The remainder of the adaptable circuit 110 may then be configured while PCIe link training takes place or after PCIe link training is complete successfully, or both during and after PCIe link training.

Using an external hardware front multiplexer 120 (instead of programming the connections made by the front multiplexer 120 into the adaptable circuit 110) may avoid the problems that otherwise might occur if the configuring of the adaptable circuit 110 takes longer than the time allocated by the PCIe standard for training of the PCIe links.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used"

may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of an adaptive interface storage device have been specifically described and illustrated herein, many modifications and variations will be apparent to those skilled in the art. Accordingly, it is to be understood that an adaptive interface storage device constructed according to principles of this disclosure may be embodied other than as specifically described herein. The invention is also defined in the following claims, and equivalents thereof

What is claimed is:

1. A device comprising:
a first connector;
a first circuit connected to the first connector;
a second circuit, connected to the first circuit; and
a second connector, connected to the second circuit,
the device being configured to operate in a first state or in a second state,
the device being configured:
in the first state, to present a first interface according to a first protocol at the second connector, and
in the second state, to present a second interface according to a second protocol, different from the first protocol, at the second connector,
wherein the second protocol is NVMe over Fabrics.

2. The device of claim 1, wherein:
the first circuit comprises a first endpoint and a second endpoint, and
the second circuit is a first multiplexer comprising:
a first multiplexer channel having a first multiplexer channel common port connected to the second connector and
a second multiplexer channel having:
a second multiplexer channel common port connected to the second connector,
a second multiplexer channel first selectable port connected to the first endpoint, and
a second multiplexer channel second selectable port connected to the second endpoint.

3. The device of claim 2, wherein the first multiplexer channel has a first multiplexer channel first selectable port connected to the first endpoint.

4. The device of claim 3, wherein:
the first multiplexer channel has a first multiplexer channel second selectable port, the first multiplexer channel second selectable port being not connected,
in the first state, the first multiplexer channel first selectable port is selected, and
in the second state, the first multiplexer channel first selectable port is selected.

5. The device of claim 2, wherein the first protocol is NMVe.

6. The device of claim 2, wherein the first circuit is connected to a first plurality of conductors of the second connector, and the first circuit is configured, in the second state, to present an Ethernet interface at the first plurality of conductors.

7. The device of claim 6, wherein the second protocol is NVMe over Fabrics, over the Ethernet interface.

8. The device of claim 2, wherein, in the first state, the second multiplexer channel first selectable port is selected.

9. The device of claim 8, wherein, in the second state, the second multiplexer channel second selectable port is selected.

10. The device of claim 9, wherein the device is further configured, in the second state, to present a first control plane interface at the second connector.

11. The device of claim 2, wherein:
the first endpoint is a four-lane endpoint,
the second endpoint is a four-lane endpoint, and
the second multiplexer channel common port has two input lanes and two output lanes.

12. The device of claim 1, wherein the first circuit is a programmable adaptable circuit, having a configuration port, and being configured, at system startup, to load a bitfile through the configuration port.

13. The device of claim 12, wherein the second circuit is a first multiplexer, the device further comprising:
a first bitfile memory;
a second bitfile memory; and
a second multiplexer,
the second multiplexer having:
a second multiplexer common port connected to the configuration port;
a second multiplexer first selectable port connected to the first bitfile memory; and
a second multiplexer second selectable port connected to the second bitfile memory.

14. The device of claim 13, wherein,
in the first state, the second multiplexer first selectable port is selected, and
in the second state, the second multiplexer second selectable port is selected.

15. The device of claim 1, wherein the second connector is a U.2 connector.

16. The device of claim 1, further comprising a state control input configured to receive a signal for selecting between the first state and the second state.

17. The device of claim 16, wherein the second connector is a U.2 connector having an E6 pin, and the state control input is the E6 pin.

18. A device, comprising:
a second connector; and
persistent storage,
the device being configured to operate in a first state or in a second state, the device being configured:
in the first state, to present a device side NVMe storage interface at the second connector, and
in the second state, to present a device side NVMe over Fabrics storage interface at the second connector.

19. A system, comprising:
a chassis; and
a device,
the device comprising:
   a first connector;
   a first circuit connected to the first connector; and
   a second circuit, connected to the first circuit,
   a second connector, connected to the second circuit,
the device being configured to operate in a first state or in a second state,
the device being configured:
   in the first state, to present a first interface according to a first protocol at the second connector, and
   in the second state, to present a second interface according to a second protocol, different from the first protocol, at the second connector,
wherein the second protocol is NVMe over Fabrics.

20. The system of claim 19, wherein:
the device further comprises a state control input configured to receive a signal for selecting between the first state, and the second state, and
the chassis is hard-wired to supply to the state control input a signal selecting the first state.

\* \* \* \* \*